United States Patent
Lee et al.

(10) Patent No.: US 11,867,457 B2
(45) Date of Patent: Jan. 9, 2024

(54) HYBRID MOBILE SHELLFISH COOLING SYSTEM

(71) Applicant: Morgan State University, Baltimore, MD (US)

(72) Inventors: Seong W. Lee, Baltimore, MD (US); Xuejun Qian, Baltimore, MD (US); Yulai Yang, Baltimore, MD (US)

(73) Assignee: Morgan State University, Baltimore, MD (US)

( * ) Notice: Subject to any disclaimer, the term of this patent is extended or adjusted under 35 U.S.C. 154(b) by 0 days.

(21) Appl. No.: 17/838,913

(22) Filed: Jun. 13, 2022

(65) Prior Publication Data

US 2022/0404093 A1 Dec. 22, 2022

Related U.S. Application Data

(60) Provisional application No. 63/209,437, filed on Jun. 11, 2021.

(51) Int. Cl.
*F25D 29/00* (2006.01)
*F25D 25/02* (2006.01)
(Continued)

(52) U.S. Cl.
CPC .......... *F25D 29/003* (2013.01); *F25B 27/005* (2013.01); *F25B 49/022* (2013.01);
(Continued)

(58) Field of Classification Search
CPC ...... F25B 27/002; F25B 27/005; F25D 11/00; F25D 11/003; F25D 17/04; F25D 17/06;
(Continued)

(56) References Cited

U.S. PATENT DOCUMENTS

| 4,501,130 A | * | 2/1985 | Izumi | A47F 3/0408 |
| | | | | 62/304 |
| 4,638,644 A | * | 1/1987 | Gidseg | F25D 17/065 |
| | | | | 62/329 |

(Continued)

FOREIGN PATENT DOCUMENTS

CN 201885503 * 6/2011

*Primary Examiner* — Jonathan Bradford
(74) *Attorney, Agent, or Firm* — Whiteford, Taylor & Preston, LLP; Gregory M. Stone

(57) ABSTRACT

A hybrid shellfish cooling system employs DC and AC cooling units using both solar power and AC electrical supply as energy sources. As temperature control and uniform temperature distribution in the cooling system are critical factors in reducing *vibrio* growth on raw oysters and reducing energy consumption, the system is equipped with a divider that optimizes airflow through the cooling system interior cabinet to achieve uniform temperature distribution in six individual internal compartments. Tests indicated that an average of 130 min. cooling was required to reach the suggested oyster temperatures of 7.2° C. and meet the cooling time requirement (i.e., 10 h or less). Airflow is further optimized via fan location and airflow direction, whereby configuration of a circulation fan on a lower part of the 12-volt DC section with an air supply from the 12-volt DC section to the 110-volt AC section achieves relatively uniform temperature distribution.

15 Claims, 6 Drawing Sheets

(51) Int. Cl.
*F25B 49/02* (2006.01)
*H02S 10/40* (2014.01)
*F25D 11/00* (2006.01)
*F25D 11/02* (2006.01)
*F25D 23/06* (2006.01)
*F25D 19/04* (2006.01)
*F25B 27/00* (2006.01)

(52) U.S. Cl.
CPC ............ *F25D 11/00* (2013.01); *F25D 11/025* (2013.01); *F25D 19/04* (2013.01); *F25D 23/069* (2013.01); *F25D 25/02* (2013.01); *H02S 10/40* (2014.12); *F25B 2600/0253* (2013.01); *F25D 2201/10* (2013.01)

(58) Field of Classification Search
CPC ........ F25D 23/06; F25D 23/069; F25D 25/02; F25D 29/003; F25D 29/005; F25D 2201/00; F25D 2201/10
See application file for complete search history.

(56) References Cited

U.S. PATENT DOCUMENTS

| | | | | |
|---|---|---|---|---|
| 4,732,432 A | * | 3/1988 | Keil | F25D 23/082 |
| | | | | 220/592.06 |
| 6,076,363 A | * | 6/2000 | Morton | B60P 3/36 |
| | | | | 62/181 |
| 2007/0248805 A1 | * | 10/2007 | Orologio | F16L 59/08 |
| | | | | 428/457 |
| 2020/0096250 A1 | * | 3/2020 | Walls, Jr. | F25D 23/069 |
| 2020/0248935 A1 | * | 8/2020 | Born | F25D 11/02 |

* cited by examiner

HYBRID MOBILE SHELLFISH COOLING SYSTEM

CROSS REFERENCE TO RELATED APPLICATIONS

This application is based upon and claims the benefit of U.S. Provisional Application No. 63/209,437 titled "Hybrid Mobile Shellfish Cooling System," filed with the United States Patent & Trademark Office on Jun. 11, 2021, the specification of which is incorporated herein by reference in its entirety.

FIELD OF THE INVENTION

This invention is directed to cooling systems, and more particularly to a hybrid powered cooling system with optimized airflow for cooling shellfish.

BACKGROUND OF THE INVENTION

Oysters play a vital role in the water ecosystems because they filter sediments, detritus, and small phytoplankton from the water to improve water quality while providing foods and habitats to hundreds of creatures. Additionally, oyster aquaculture has been partially approved as an alternative management practice for nutrient reduction (e.g., nitrogen and phosphorus) in the Chesapeake Bay region and other water bodies. This is because oysters consume organic materials from their aquatic environment by specialized filtration systems. However, several factors have contributed to a decline in oyster populations associated with the Chesapeake Bay, including overharvesting, habitat destruction, and mortal diseases (e.g., Multinuclear Sphere X and Dermo). Among these factors, overharvesting has played a key role in the declination of the oyster population. In 2009, Maryland's Oyster Restoration and Aquaculture Development Plan announced that the State of Maryland was to gradually shift the oyster business from a fishing model of wild oysters into a farming model of cultured oysters. This business model change was expected to accommodate overharvesting and the decline of oysters in the Bay areas. In recent years, oyster aquaculture in Maryland was estimated to have a total economic output of 8.1 million USD, while boosting employment with 133 new jobs in 2018. Nationally, oysters remain as one of the largest growing marine species groups under aquaculture, valued at 173 million USD in 2015 and 192 million USD in 2016. Accordingly, oyster aquaculture will not only continue to grow and play a more important role in the nation's economy, but it can integrate into best watershed management practices by reducing nutrients and improving water quality.

Moreover, while consumption of raw oysters is only increasing, several studies suggest that the consumption of cultured raw molluscan shellfish (e.g., oysters, clams, mussels, and scallops) is associated with foodborne illnesses and risk of infections from vibrio bacteria, such as *Vibrio vulnificus* (Vv) and *Vibrio parahaemolyticus* (Vp). One approach proposed by the National Shellfish Sanitation Program (NSSP) for reducing bacteria quantity is post-harvest processing (PHP) methods. PHP methods include cool pasteurization, rapid freezing, low-dose gamma-irradiation, high-hydrostatic pressure, high-sanity relaying, and thermal processing. However, these PHP methods are costly technologies and may negatively affect the taste of raw oysters. Temperature control of oysters during harvesting, processing, and distribution processes was another proposed approach to inhibit and decrease vibrio growth. According to the NSSP, for appropriate Vp control, the internal temperature of oysters for raw consumption must reach 10° C. (or less) within 10 h after being placed into a refrigeration system during the warm summer season. Several investigations further support the role of temperature control on Vp growth, specifically, from maintaining storage temperature at 7.2° C. to hamper pathogen growth. Uniformity of temperature distribution in refrigeration systems was found to extend the living cycle of food and minimize bacterial growth. At the same time, keeping a uniform distribution of temperature was found to improve the storage quality of products while reducing energy consumption. Previous computational fluid dynamics simulation studies found that both temperature distribution and thermal behavior may be influenced by the refrigeration system's interior design, cooling load conditions, and the addition of fans.

In the past, ice was widely used as a cooling medium in traditional fishing boats in order to control temperature and store cultured oysters. It was found that oysters directly exposed to the ice after one to two weeks post-harvest exhibited significant gaping among the oyster shells. Furthermore, unexpected mortalities in oysters have been correlated with gaping. Ice is also not an ideal option for storing oysters for long periods of time, often during long-distance transportation of the oysters due to its tendency of melting rather easily. Conventional cooling systems (also known and referred to as refrigeration systems) utilize hazardous refrigerants (e.g., chlorofluorocarbons, hydrochlorofluorocarbons, fluorocarbons, and hydrofluorocarbons), which can deplete ozone layers and cause global warming phenomena, such that there is desire to identify and deploy new types of refrigerants. A wide variety of mechanical refrigerating systems exist today, including those with environmentally friendly refrigerants (e.g., R717 and R744), depending on the fish species, size, and processing methods. In addition, there exists emerging refrigeration technologies, such as sorption refrigeration, ejector refrigeration, air cycle refrigeration, trigeneration, Stirling cycle refrigeration, thermoelectric refrigeration, thermoacoustic refrigeration, and magnetic refrigeration system. However, the deployment of new refrigerants and refrigeration technologies are restricted by the size of fishing boats and increasing fuel (or electricity) prices. In addition, conventional refrigeration systems consume mainly electricity and large amounts of carbon dioxide are emitted during electricity generation processes, such that there remains a need for alternative means of powering refrigeration systems.

SUMMARY OF THE INVENTION

In accordance with certain aspects of an embodiment of the invention, a hybrid shellfish cooling system is disclosed herein that employs both DC and AC cooling units that use both solar power and AC electrical supply as energy sources. As temperature control and uniform temperature distribution in cooling systems are critical factors in reducing *vibrio* growth on raw oysters and reducing energy consumption, the hybrid cooling system is equipped with a specially configured divider that optimizes airflow through the refrigerator interior cabinet to achieve uniform temperature distribution in six individual internal compartments inside of the refrigerator. Airflow was further optimized via fan location and airflow direction, whereby a circulation fan located on the lower part of the 12-volt section with an air supply from the 12- to 110-volt section was determined to provide the optimal condition to achieve relatively uniform temperature distribution. A cooling system configured in accordance with aspects of the invention also achieved a cooling temperature of 7.2° C. within 150 min. (an average of 130 min.) to meet regulations. To that end, the innovative hybrid oyster cooling system disclosed herein will benefit oyster industries, as well as the aquaculture farmers in terms of complying with regulations and energy savings.

A hybrid shellfish cooling system configured in accordance with certain aspects of the invention employs a combination of waste-heat, solar energy, and electricity along with innovative control strategies to reduce environmental problems, optimize the energy efficiency, and enhance overall coefficient of performance. Recently, sorption systems (i.e., thermal) and conventional vapor compression systems (i.e., electricity) have been studied on system operational functionality. The results indicated that the system was running normally and had 6 kW cooling production. Three proportional integral control methods were applied in the cooling system to control fan operation, improve energy efficiency, and reduce power consumption between 49.5% and 67.4%. Solar energy (or photovoltaic) is one of the cleanest, cost-effective, and most abundant alternative renewable energy sources that exist today. Performance tests of solar-powered refrigerators in different climate zones strongly supports solar energy as a viable energy resource for the instant hybrid refrigeration system. Experimental results showed that a hybrid cooling system configured in accordance with aspects of the invention can work well in many different climates and regions. Solar-powered refrigeration systems have also been studied in order to determine the different parameters (e.g., time of day, and cooling load) affecting the system performance (e.g., energy consumption and power production on solar panels). To that end, collecting and utilizing solar energy to provide a portion of power for the hybrid refrigeration system set forth herein during oyster farming processes on bays and estuaries may play a vital role in reducing fuel and energy consumption from fishing boats.

Cooling performance was widely used to evaluate system performance for multiple systems, including a ground source heat pump system, steam cooled gas turbine nozzle guide vane, and internally cooled liquid desiccant absorbers. These studies confirmed that cooling performance is critical and necessary to evaluate system performance of the instant hybrid refrigeration system. A few technical challenges have also been identified during the development of the instant hybrid oyster cooling process. First, it needs to reach a cooling temperature that complies with legal requirements (i.e., 7.2° C. or lower within 10 hours) in order to minimize vibrio growth. Second, the process must avoid a local rise in temperature within the cooling cabinet to prevent damaging oyster freshness and taste. Third, it needs to use solar energy as an alternative energy resource to reduce energy and fuel consumption of the refrigeration systems from the fishing boats. Thus, cooling time to reach the desired storage temperature and temperature distribution were identified as performance factors to resolve these technical challenges in the refrigeration systems of the instant invention. Factorial design is one of the most effective statistical methods to plan and conduct experiments in a systematic way in order to evaluate the effect of operating factors on the response of energy conversion systems. The effect of air circulation strategies and operating conditions on cooling performance (e.g., cooling time and temperature distribution) was evaluated on a lab-scale hybrid oyster refrigeration system configured in accordance with aspects of the invention during the oyster cooling process using the factorial design method.

In accordance with certain aspects of an embodiment of the invention, a mobile hybrid shellfish cooling system is provided, comprising a steel frame, a cooling chamber on an interior of the steel frame, the cooling chamber having a plurality of horizontal shelves and a centrally positioned divider wall separating the cooling chamber into a first cooling portion and a second cooling portion, a 12-volt DC power unit supplying 12-volt power to a DC cooling system; and a 110-volt AC power unit supplying power to an AC cooling system.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which.

DETAILED DESCRIPTION

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Figure 1:
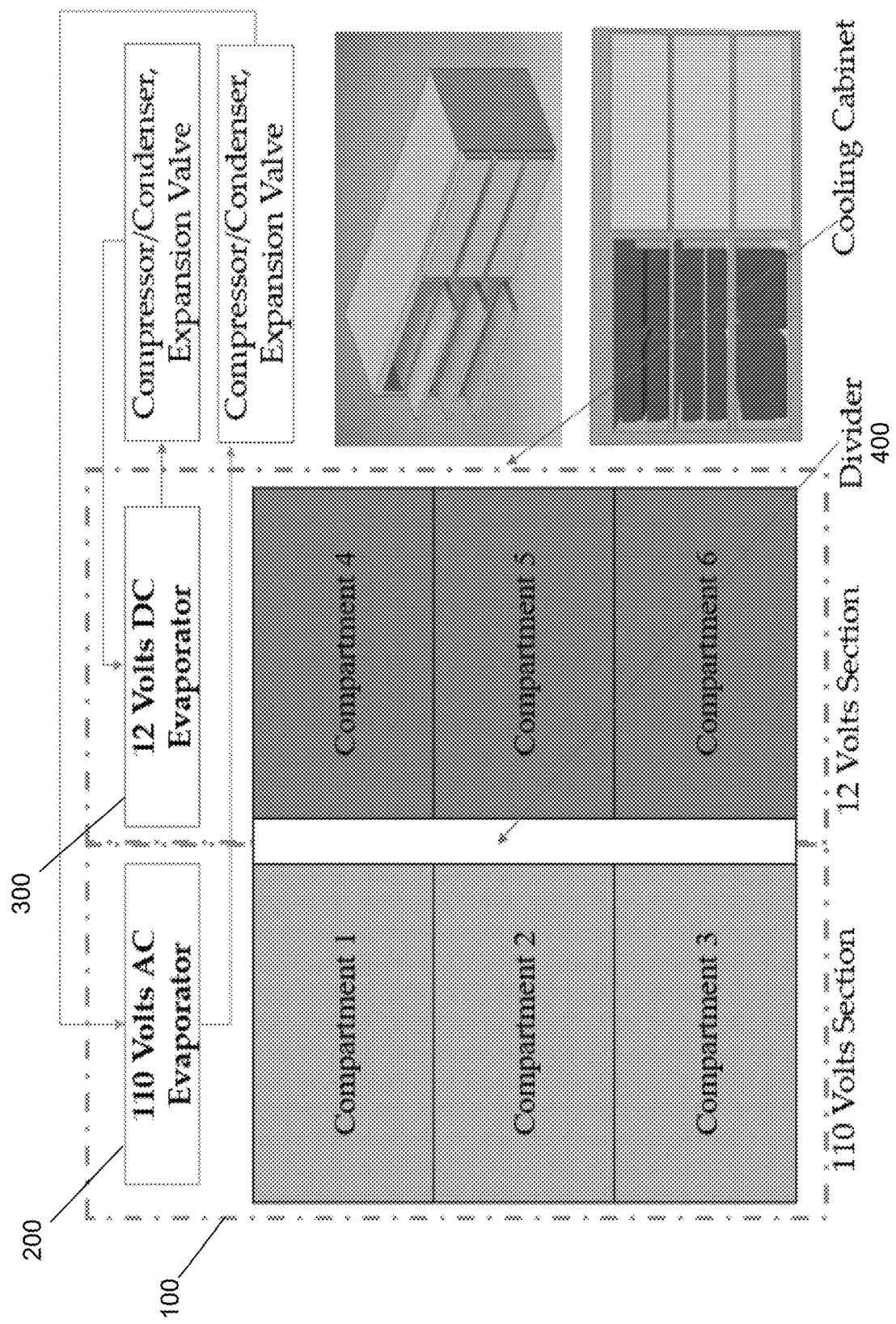
FIG. 1 is a schematic view of a hybrid shellfish cooling system in accordance with aspects of the invention.

In accordance with certain aspects of an embodiment, a lab-scale hybrid oyster cooling system was configured to carry a total of a plurality of boxes, such as by way of non-limiting example 16 boxes (12 small boxes with 4 large boxes) of raw oysters. As shown in FIG. 1, the conceptual design of the lab-scale hybrid oyster cooling system includes a cooling cabinet 100, a 110 volt AC cooling unit 200, a 12 volt DC cooling unit 300, and other accessories that enable the utilization of both solar and boat-provided energy during various oyster farming processes. Key components of the cooling units include an evaporator, compressor, condenser, expansion valve, among other connections, the configurations of which are standard and known to those of ordinary skill in the art. The cooling cabinet is composed of multiple, and in an exemplary embodiment six, individual compartments (e.g., 889 mm width 368.3 mm height 546.1 mm depth for each compartment), numbered for reference purposes in FIG. 1 from 1 to 6 across two sections: 110 volts on the left section shown in FIG. 1 (AC Cooling) and 12 volts on the right section shown in FIG. 1 (DC Cooling). Compartments 1-3 belong to the left section and compartments 4-6 belong to the right section. A separate door is preferably provided for each compartment to allow for oysters to be inserted into one of the compartments with minimal influence on the other compartments, in order to limit heat loss for maintaining the oysters' freshness.

Figure 2:
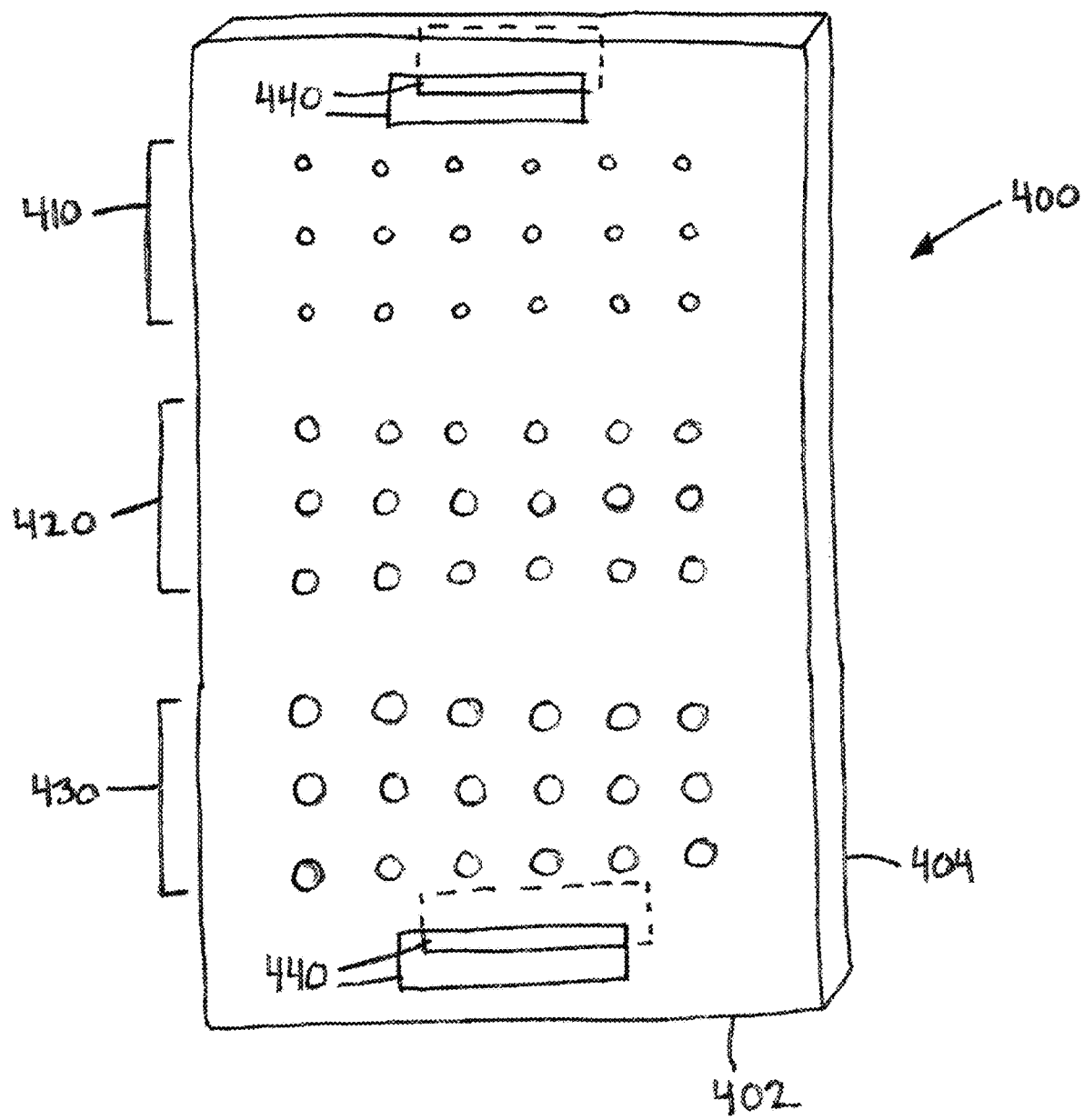
FIG. 2 is a front perspective view of a divider for use in the hybrid shellfish cooling system of FIG. 1.

With continued reference to FIG. 1 and the close-up view of FIG. 2, a divider 400 having preferably a thickness of approximately 50.8 mm (2 inch) is vertically erected in the middle of the cooling box to divide the inner container into two sections and allow for optimized air circulation. In an exemplary embodiment, divider 400 may be formed of ¼ inch clear acrylic sheet which is readily commercially available. Divider 400 provides a total of 108 openings (54 in a first side 402 of divider 400 and 54 in a second side 404 of divider 400). A first, top set of 18 openings 410 separated into 3 rows of 6 openings each on each of first side 402 and second side 404 of divider 400 preferably have a diameter of approximately 6.35 mm (¼ inch). A second, middle set of 18 openings 420 separated into 3 rows of 6 openings each on each of first side 402 and second side 404 of divider 400 preferably have a diameter of approximately 12.7 mm (½ inch). Finally, a third, bottom set of 18 openings 430 separated into 3 rows of 6 openings each on each of first side 402 and second side 404 of divider 400 preferably have a diameter of approximately 19.05 mm (¾ inch). Further, two rectangular vents 440 are provided on each of the top and bottom portions of first side 402 and second side 404 of divider 400. A quiet booster fan (not shown), operating with an air flow rate of, for example, 0.0566 $m^3/s$, is installed to create forced air circulation. In addition, each section is divided into three vertically stacked compartments by wire decking, with 50.8 mm insulation foam horizontally positioned on each section of wire decking. Other accessories, all-purpose sealant, waterproof aluminum roll flashing, and spray foam insulation material were used to connect various components and close small gaps, all of which are of standard configurations well known to those of ordinary skill in the art.

Figure 3:
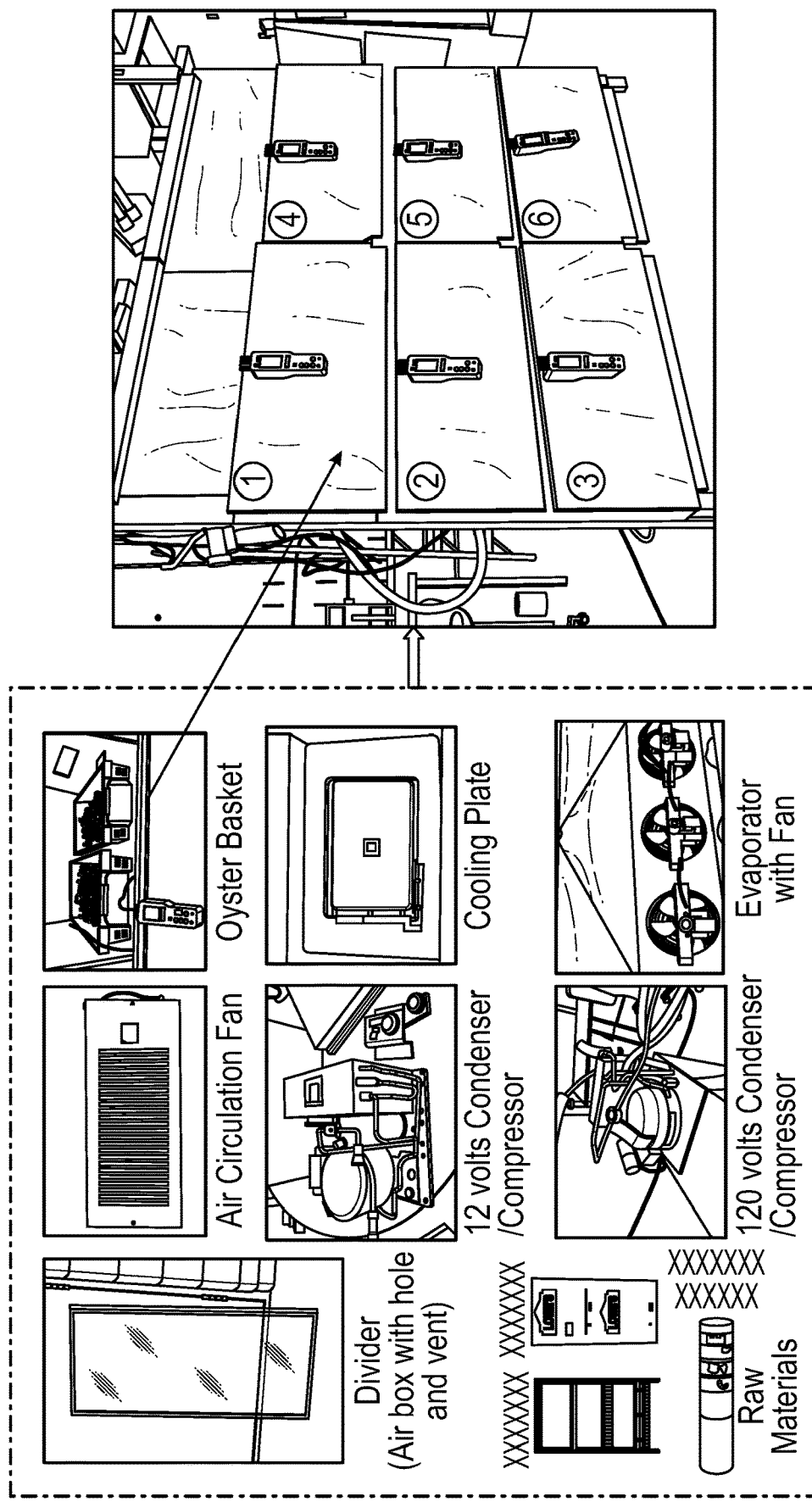
FIG. 3 is a schematic view of the major components and materials of a hybrid shellfish cooling system according to certain aspects of an embodiment of the invention.

The components of a hybrid mobile shellfish cooling system configured in accordance with aspects of the invention (and the raw material components used therein) are shown in FIG. 3. Fabrication and assembly of a lab-scale, prototype hybrid oyster cooling system configured in accordance with aspects of the invention were performed by laboratory staff in the Center for Advanced Energy Systems and Environmental Control Technologies (CAESECT) at Morgan State University, Baltimore, Maryland. The frame of the cooling system was built and modified from a heavy-duty steel garage shelving unit (GARS774XEG, Gladiator, Belton Harbor, MI, USA) with weight capacity of 907.18 kg to carry the required amount of oysters (about 100-110 kg) within a safe structure. The exterior walls of the cooling system were cut from unfaced polystyrene insulation foam boards (Item #338136, Kingspan Insulation, Atlanta, GA, USA). The double-sided bubble reflective insulation rolls (Item #2541504, Reflectix, Markleville, IN, USA) were added to the inner parts of the insulation foam board. The combination of these two insulation materials provided a higher R value to slow the rate of heat transfer between the refrigerator and the outside environment during the cooling process. The lab-scale hybrid shellfish cooling system was then integrated with two cooling units, an AC cooling unit and a DC cooling unit. The AC system consisted of a condensing/compressor unit (M6JM-H023-IAA-177, Emerson, St. Louis, MO, USA) and evaporator unit with fan (KMK230, KeepRite Refrigeration, Brantford, ON, Canada) to ensure a cooling capacity of 697.5 watts and an energy efficiency ratio of 5.5, equivalent to a coefficient of performance ("COP") of 6.37. The 12-volt system (CoolBlue, Technautics, Escondido, CA, USA) consists of a variable speed compressor/condenser and evaporator unit (or cooling plate) to provide autosensing and various cooling capacities under different voltage settings/inner environments. Both evaporator units were installed on the top of the cooling cabinet. The DC unit was attached to the 12-volt battery and charger on the wall outlet while the AC unit was directly connected to an adjacent wall outlet. This hybrid system also operates two refrigerants (R134a in DC system and R404a in AC system), which have relatively lower pollutions than chlorofluorocarbons (CFC) refrigerants. Both the AC and DC cooling systems employ a basic refrigeration cycle.

In order to closely simulate the oyster cooling process within the foregoing lab-scale hybrid shellfish cooling system configured in accordance with aspects of the invention, oyster shells with equal amounts of water were added to simulate the conditions of cultured raw oysters. The water served as a cooling load to replace the missing oyster meat of the shell. The baskets with oyster shells and water were inserted into each compartment. Table 1 below displays the weight of shells (in kg) and water (in kg) in each compartment. The total amount of 95.2 kg of oyster shells plus 10 kg of water was placed into the cooling system to simulate the approximate weight of a 107.1 kg oyster cooling process. The specific heat of oysters and water was assumed to be 3.52 J/g° C. and 4.186 J/g °, respectively. One digital thermometer (Item #8541957450, Amazon, Seattle, WA, USA) was used to monitor real-time temperature changes in each compartment. Each thermometer had four channels of K-type temperature sensors with an uncertainty of 2.0° C. (<100° C.) and temperature resolution of 0.1° C. (<1000° C.) that measured temperatures at four different points (i.e., oyster shell surface, middle of oyster shell pack, top layer of oyster shell pack, and 12.7 mm above top layer of oyster shell pack). Average temperatures for each compartment were calculated from the observed temperature at each of the four points and recorded every 20 min. System performance and cooling time was set to the desired temperature of 7.2° C. and temperature distribution in the cooling cabinet were evaluated under different operating conditions. Three different scenarios of air circulation—no air circulation, natural air circulation, and combined forced and natural air circulation—were tested to study the temperature distribution.

TABLE 1

Distribution of oyster shell and water in the cooling system.

| 110 Volt AC Cooling Unit (Left Section) | 12 Volt DC Cooling Unit (Right Section) |
|---|---|
| Compartment 1 (kg) | Compartment 4 (kg) |
| 4.76 shell + 0.5 water   4.76 shell + 0.5 water | 4.76 shell + 0.5 water   4.76 shell + 0.5 water |
| Total: 9.52 shell + 1 water | Total: 9.52 shell + 1 water |
| Compartment 2 (kg) | Compartment 5 (kg) |
| 9.52 shell + 1 water   9.52 shell + 1 water | 9.52 shell + 1 water   9.52 shell + 1 water |
| Total: 19.04 shell + 2 water | Total: 19.04 shell + 2 water |
| Compartment 3 (kg) | Compartment 6 (kg) |
| 9.52 shell + 1 water   9.52 shell + 1 water | 9.52 shell + 1 water   9.52 shell + 1 water |
| Total: 19.04 shell + 2 water | Total: 19.04 shell + 2 water |

Factorial design methods with statistical analysis were used to further determine whether the system cooling performance was meaningfully affected by operating conditions. Factorial design consists of one or more independent variables or factors, each with discrete possible values or levels to investigate the effect of multiple factors on a dependent variable or response. Characterization experiments using the one factor-at-a-time (OFAT) strategy were conducted first, followed by two operating factors that were selected based on preliminary results. Fan location was factor A, with the high level denoting the fan mounted at the upper part of the cooling cabinet and the low level denoting the fan mounted at the lower part of the cooling cabinet. Fan direction was factor B, with the high level denoting the fan circulating air from the AC section to the DC section. Factor B's low level was the fan circulating air from the DC section to the AC section. Two levels for each factor, a $2^2$ factorial design, were used to analyze and optimize the performance of the cooling system. Standard deviation of compartment temperatures after a 4-hour cooling process was used as the first response variable. Cooling time for average oyster temperature to be cooled down to 7.2° C. were determined as the second response variable. Experiments were performed randomly, and each experiment had two replicates with a total of 8 runs. All statistical analyses were performed using the software package Minitab (version 17, Minitab, LLC., State College, PA, US, 2014). Statistical significance was set at 5%. In this study, cooling performance analysis is the process of analyzing temperature distribution, standard deviation, and required cooling time.

Figure 4:
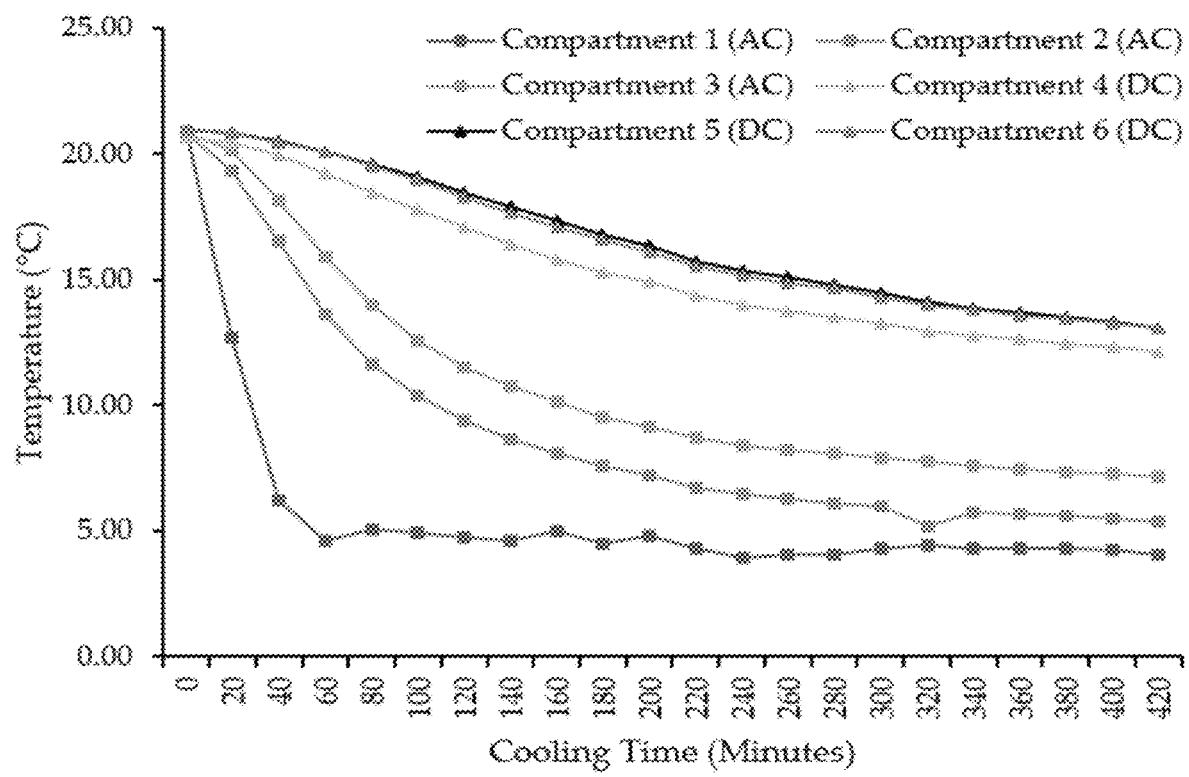
FIG. 4 is a graph showing temperature changes in individual compartments of a hybrid shellfish cooling system according to certain aspects of an embodiment of the invention (without air circulation).

In order to investigate the effects of air circulation on the performance of the foregoing lab-scale hybrid shellfish cooling system, three different scenarios were compared. In the first scenario, vents and holes on each divider were closed. FIG. 4 summarizes the temperature changes in individual compartments based on cooling time. After 420 min. of cooling, the temperature in each compartment dropped from 20.9±2.0° C. to 4.1±2.0° C. for compartment 1, from 20.8±2.0° C. to 5.4±2.0° C. for compartment 2, from 20.8±2.0° C. to 7.2±2.0° C. for compartment 3, from 20.6±2.0° C. to 12.2±2.0° C. for compartment 4, from 20.9±2.0° C. to 13.1±2.0° C. for compartment 5, and from 21.0±2.0° C. to 13.0±2.0° C. for compartment 6. Temperature stratification was also observed, with the lowest temperatures measured at compartment 1 and the highest temperature at compartment 6 with a temperature difference of 8.9±2.0° C. Results indicated that temperatures in the DC sections were lower than the AC sections. The temperature difference between the maximum and the minimum compartment temperature in the AC section was 3.1±2.0° C. which was higher than the DC section at 0.8±2.0° C. One possible reason for this observation is the large cooling capacity of the AC section leading to a higher temperature variance compared to the DC section with relatively lower cooling capacity. Results suggest that the AC cooling unit was appropriate to fulfill the cooling time requirement while the DC cooling unit was able to maintain cooling temperature with minimum temperature deviation. To achieve lower temperature variances between compartments, toward uniform temperature distribution, results indicate the need for air circulation in the cooling cabinet.

Figure 5:
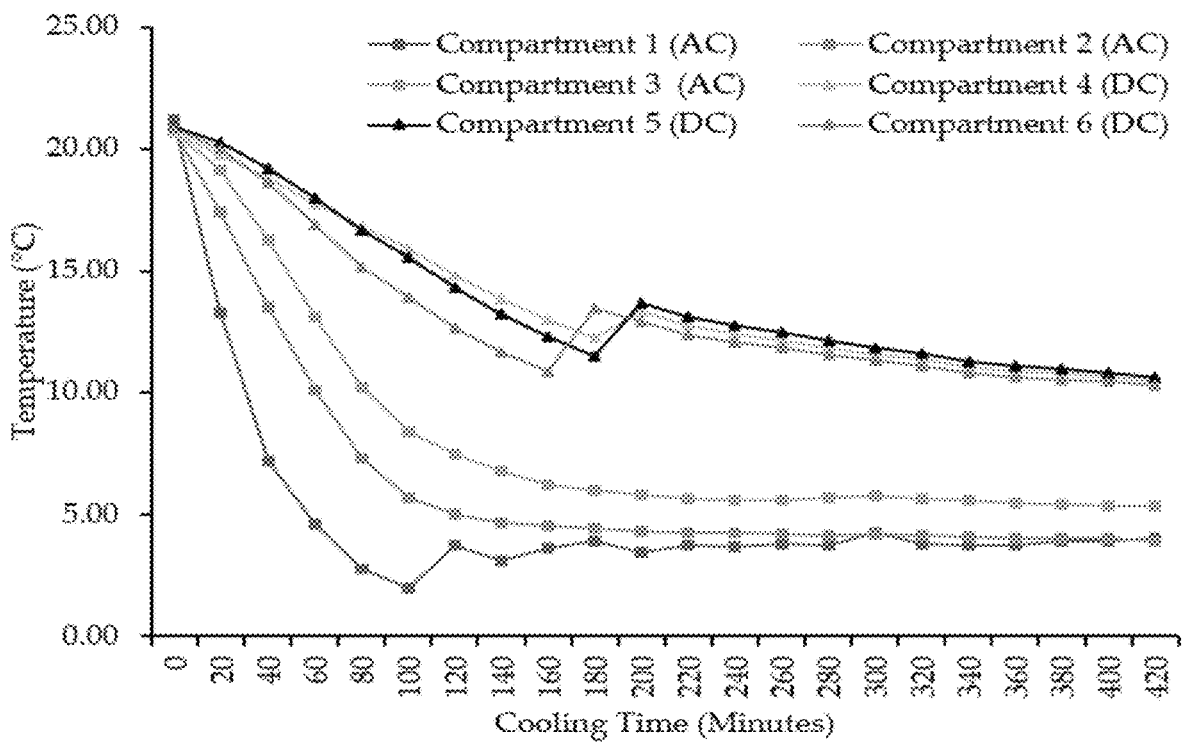
FIG. 5 is a graph showing temperature changes in individual compartments of a hybrid shellfish cooling system according to further aspects of an embodiment of the invention (with nature air circulation).

In the study's second scenario, vents and holes on the divider 400 were both opened to initiate natural convection for air circulation between the AC and DC sections. FIG. 5 summarizes the temperature changes in an individual compartment based on cooling time. After 420 min. of cooling, the temperature had changed from 21.2±2.0° C. to 4.0±2.0° C. for compartment 1, from 20.8±2.0° C. to 3.9±2.0° C. for compartment 2, from 20.8±2.0° C. to 5.4±2.0° C. for compartment 3, from 20.7±2.0° C. to 10.5±2.0° C. for compartment 4, from 20.9±2.0° C. to 10.6±2.0° C. for compartment 5, and from 20.8±2.0° C. to 10.3±2.0° C. for compartment 6. The maximum temperature difference was found between compartment 2 and 5 (at about 6.7° C.) and was reduced from 8.9±2.0° C. (between compartment 1 and 6) to 6.7±2.0° C., compared to the previous scenario. With similar initial temperature and cooling times of 420 min., individual compartment temperatures were lower than the first scenario because vents and holes on the divider assisted with producing natural air convection with density variation and laminar flow, effectively collecting hot air from the DC side while transferring heat into the refrigerant through the evaporator of AC cooling unit. Based on the foregoing and other research findings, it is understood that the design of divider 400 as configured above with holes and vents has the potential to provide natural convection and improve uniform temperature distribution. In addition, minor temperature increments in the cooling cabinet were observed at 160 and 200 min. because the door had to be opened to check on the temperature sensors, consequently bringing partial warm air from the outside environment into the cooling cabinet. It also suggests that just by opening the single door of a traditional cooling system to insert each oyster basket is enough to affect the whole refrigeration system. Thus, a multi-compartment design, each with its own individual door, may reduce energy consumption and maintain freshness of oysters.

Figure 6:
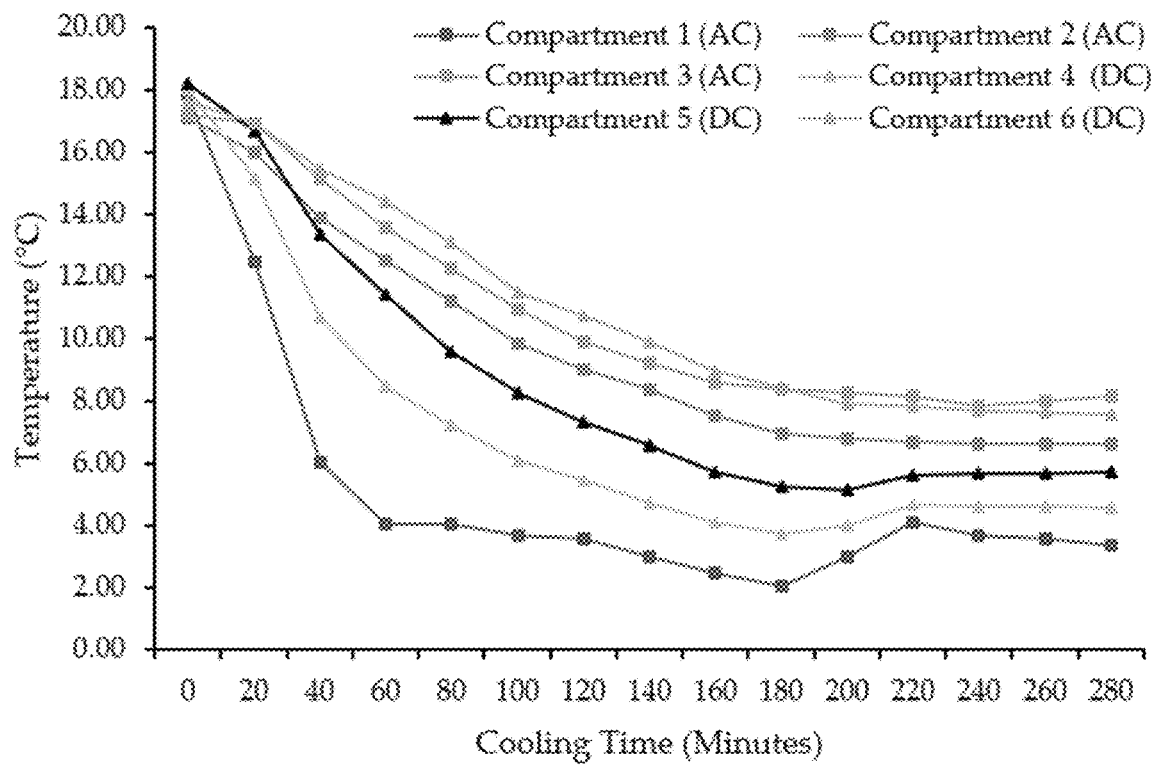
FIG. 6 is a graph showing temperature changes in individual compartments of a hybrid shellfish cooling system according to still further aspects of an embodiment of the invention (with natural and forced air circulation).

In the third scenario, vents and holes on divider 400 were both opened to provide natural air convection and air circulation with the addition of a fan to supply forced air convection. FIG. 6 shows the temperature changes in individual compartments based on cooling time. This test was only performed for 280 min. because the lowest temperature was reached at 3.3±2.0° C. Any additional cooling may reduce temperature and ultimately kill oysters. Temperatures were observed to have dropped from 17.9±2.0° C. to 3.3±2.0° C., from 17.1±2.0° C. to 6.6±2.0° C., from 17.2±2.0° C. to 8.1±2.0° C., from 18.0±2.0° C. to 4.5±2.0° C., from 18.2±2.0° C. to 5.7±2.0° C., and from 17.6±2.0° C. to 7.5±2.0° C. for compartment 1, 2, 3, 4, 5, and 6, respectively. The maximum temperature difference was found between compartment 1 and 3 (about 4.8±2.0° C.), which is a substantial decrease compared to previous scenarios. Individual compartment temperatures were also lower compared to previous two scenarios. The foregoing confirmed that forced air convection resulting from the addition of a circulation fan reduced temperature variance in the refrigerator. Compared with the previous two scenarios, cooling time was reduced to 280 min., saving 140 min. because of forced air circulation generated by a fan installed in the lower cooling capacity side (i.e., the DC section) in order to remove hot air from the DC section to the AC section. The DC cooling unit has lower cooling capacity to dissipate large amounts of heat in hot air. Thus, partial heat from the hot air in the DC section was rejected more effectively through higher cooling rates in the AC section. Moreover, we found that the coldest region (compartment 1) reached its coldest temperature of 4.60° C. at 60 min., 1.94° C. at 100 min., and 2.06° C. at 180 min. cooling process for the scenarios 1, 2, and 3, respectively. This demonstrates the fact that caught oysters would be shocked if they were suddenly transferred from the sea environment (at normal sea water temperature, about 21° C.) into scenarios with lower temperatures (i.e., 5° C. or less). Thus, we added an air circulation fan with opened vents and holes on the divider to reach the recommended storage temperature (i.e., 10° C.) within the acceptable cooling time, while maintaining a low rate of temperature reduction and avoiding shock for the contained oysters.

In order to further investigate the effect of air circulation fan location and direction on cooling performance, $2^2$ factorial design method and analysis of variance (ANOVA) tests were used. As shown in Table 2, standard deviation of temperatures among the six compartments ranges from 1.46° C. to 2.67° C. after a 4 h cooling process within the lab-scale hybrid shellfish cooling system configured in accordance with aspects of the invention. As shown in Table 3, ANOVA results indicate that there was a significant interaction between the two-way interaction of selected factors and standard deviation of the compartment temperatures because the p-value of two-way interactions was 0.007, which was much lower than the significant level of 0.05. On the contrary, separate effects of fan location and fan direction on temperature variance were not significant due to higher p-values (>0.05).

TABLE 2

Factorial design with standard deviation of compartment temperatures ($\delta$) as response variable.

| Factor | | Treatment | Replicate | |
|---|---|---|---|---|
| A | B | Combination | I | II |
| − | − | A low, B low | 1.63 | 1.63 |
| + | − | A high, B low | 2.49 | 2.34 |
| − | + | A low, B high | 2.67 | 2.33 |
| + | + | A high, B high | 1.95 | 1.46 |

TABLE 3

Summary of analysis of variance (ANOVA) results.

| Source | DF | Adj SS | Adj MS | F-Value | p-Value |
|---|---|---|---|---|---|
| A (Fan Location) | 1 | 0.00005 | 0.00005 | 0.00 | 0.976 |
| B (Fan Direction) | 1 | 0.01280 | 0.01280 | 0.27 | 0.630 |
| 2-Way Interaction | 1 | 1.24820 | 1.24820 | 26.40 | 0.007 |
| Error | 4 | 0.18910 | 0.04727 | | |
| Total | 7 | 1.45015 | | | |

Figure 7:
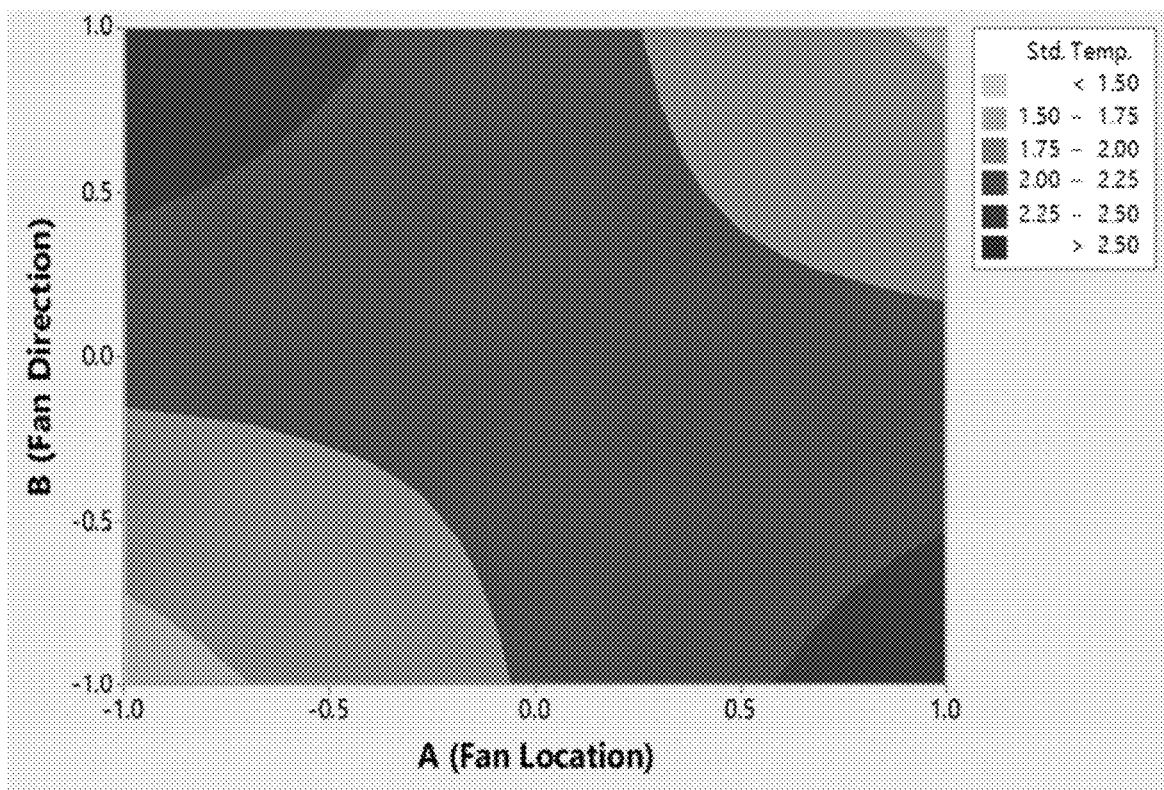
FIG. 7 is a contour plot of fan location and fan direction versus temperature deviation in a hybrid shellfish cooling system according to certain aspects of an embodiment of the invention.

As shown in FIG. 7, the contour plot of this model suggests that the response C7 (standard deviation of compartment temperatures) was in the smallest range of 1.50° C. to 2.00° C. when A and B factors were at the low levels. This may be explained by the installation of a fan on the bottom of the cooling unit (factor A at low level), which provided air from the DC section to the AC section (factor B at low level). This resulted in the lowest temperature deviation and achieved uniform temperature distribution in the lab-scale hybrid oyster cooling system. It can then be postulated that the DC section had a relatively lower cooling capacity, resulting in being the hottest regions during the cooling process. Thus, an additional fan was required to effectively remove and circulate the hot air from the DC section to the AC section. High amounts of heat in the hot air were then rejected by the higher cooling capacity of the AC cooling unit.

Table 4 summarizes the cooling time needed to reach the suggested oyster temperatures of 7.2° C. under different fan locations and directions. An average of 130 min. was required to meet the cooling time requirement (i.e., 10 h or less). Cooling time was further reduced to 110 min. by installation of a fan on the top location and providing air from the AC section to the DC section, but the temperature deviation was still high (about 1.71° C.). By contrast, the installation of a fan on the bottom of the DC section provided circulating air from the 12-volt DC section to the 110-volt AC section with a slightly longer cooling time (about 150 min.) compared to other cases. Nevertheless, we found the temperature deviation to be at its lowest, thereby achieving relatively uniform temperature distribution. These results support the idea that the cooling time to achieve the desired temperature and temperature variance among compartments have a strong relationship. Therefore, a fan was installed on the bottom of the DC section to provide air circulation from the 12-volt DC section to the 110-volt AC section and provide a similar temperature environment with minimal temperature variance for the caught oysters. A slight increase in the cooling time was acceptable and remained in compliance with the regulations (i.e., 10 h or less). From the ANOVA test results of cooling time, p-value was 0.473, 0.378, and 0.584 for the fan location, fan direction and two-way interaction, respectively. p-value of the main factors and two-way interactions were both greater than 0.05 and thus there was no significant effect between chosen factors and cooling time.

TABLE 4

$2^2$ factorial design with cooling time as response variable.

| Factor | | Treatment | Replicate (min) | | Total | Average |
|---|---|---|---|---|---|---|
| A | B | Combination | I | II | (Min) | (min) |
| − | − | A low, B low | 300 | 100 | 400 | 150 |
| + | − | A high, B low | 140 | 120 | 260 | 130 |
| − | + | A low, B high | 120 | 120 | 240 | 120 |
| + | + | A high, B high | 120 | 100 | 220 | 110 |

Figure 8:
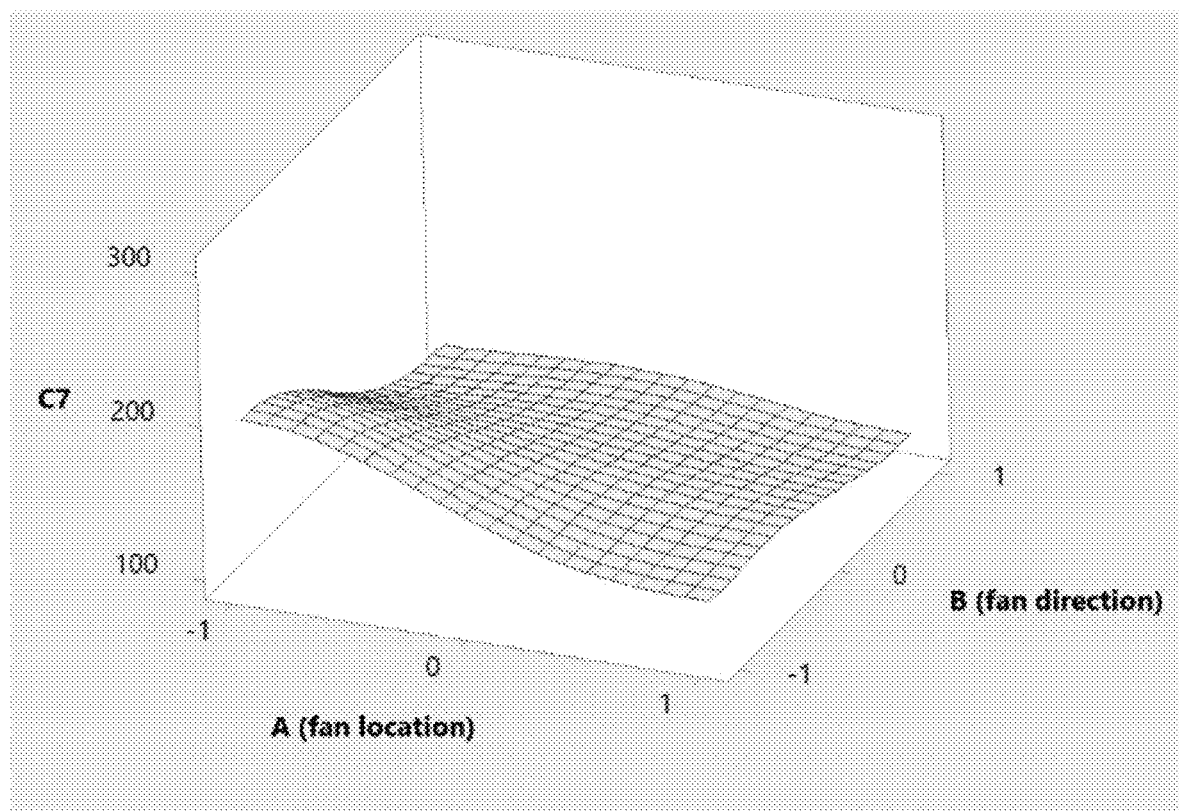
FIG. 8 is a surface plot of cooling time versus fan direction and fan location (C7: cooling time in minutes).

As shown in FIG. 8, C7 indicated the cooling time under various fan location and direction conditions. The surface plot tends to be flat, confirming that the fan direction and fan location did not have significant effect on the cooling time. It is possible that cooling time was more dependent on the cooling capacity of the evaporator and compressor. However, it was found that the location of the fan and direction of the fan affected the temperature distribution of cooling system.

A refrigeration system is critical to maintaining freshness and to avoiding *vibrio* bacteria growth for shellfish such as cultured oysters before raw consumption. However, the deployment of new refrigerants and refrigeration technologies in the conventional refrigeration systems are limited by the power capacity of fishing boats and increasing fuels (or electricity) prices. A hybrid refrigeration system configured in accordance with aspects of the invention as described above address such issues through the use of the waste-to-heat and electricity as energy resources during the cooling process. In accordance with aspects of the invention, a hybrid shellfish refrigeration system integrates both 12-volt DC and 110-volt AC cooling units with a specially designed divider and air circulation strategies to achieve uniform temperature distribution and satisfy food safety regulations during the oyster cooling process. This hybrid refrigeration system was developed to use electricity for the AC cooling unit and solar energy for the DC cooling unit during the oyster farming process (e.g., harvesting, storage, and transporting). Within three different air circulation strategies, the lowest temperature difference was observed to be 4.8±2.0° C. when vents and holes on the specially designed divider were both opened to provide natural air convection while an air circulation fan supplied forced air convection. Statistical analysis of fan location and direction showed no significance for the cooling time but had a significant effect on the variance of the compartment temperatures. The optimal condition was found to be a circulation fan located at the lower level of the DC section and air supply from the DC section to the AC section to control air flow, reduce temperature variation, and provide uniform temperature distribution among the six individual compartments. Results also indicated that the cooling system can achieve the cooling temperature of 7.2° C. with a standard deviation of 1.5° C. within 150 min. of cooling to meet the ideal storage temperatures as required by regulations (i.e., 10 h or less). The foregoing analysis shows the importance of air flow on temperature distribution and the benefits of using solar energy in the DC cooling system of a hybrid cooling system configured in accordance with aspects of the invention. Such a system may be used to maintain freshness of cultivated raw molluscan shellfish (i.e., oysters), particularly from the Bay areas, where solar energy is abundant. Temperature data may be further used to calculate heat load, coefficient of performance (COP), and heat transfer. Solar panels along with a controller may be used to provide DC power to the DC cooling unit, confirming the feasibility of solar energy utilization as an alternative energy resource for raw oysters cooling in fishing boats. In addition, flexible marine solar panels designed for the marine environment may be incorporated into an overhead awning, which may be retractable, to provide shade to the unit while also collecting solar energy.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A mobile hybrid shellfish cooling system, comprising:
a steel frame;
a cooling chamber on an interior of said steel frame, the cooling chamber having a plurality of horizontal shelves and a centrally positioned divider wall separating the cooling chamber into a first cooling portion and a second cooling portion;
a 12-volt DC power unit supplying power to a DC cooling system, wherein the DC cooling system directly provides cooling only to said first cooling portion; and
a 110-volt AC power unit supplying power to an AC cooling system, wherein the AC cooling system directly provides cooling only to said second cooling portion;
and wherein said DC cooling system and said AC cooling system are operable to provide airflow from the first cooling portion to the second cooling portion.

2. The mobile hybrid shellfish cooling system of claim 1, further comprising a solar panel in electrical communication with said DC cooling system.

3. The mobile hybrid shellfish cooling system of claim 1, said DC cooling system further comprising a variable speed compressor/condenser and an evaporator unit.

4. The mobile hybrid shellfish cooling system of claim 1, said DC cooling system further comprising a cooling plate.

5. The mobile hybrid shellfish cooling system of claim 1, said AC cooling system further comprising a condensing unit and an evaporator unit.

6. The mobile hybrid shellfish cooling system of claim 1, further comprising a stainless steel cover mounted to a top of the frame.

7. The mobile hybrid shellfish cooling system of claim 1, further comprising exterior walls mounted to the frame, said exterior walls comprising unfaced polystyrene foam board insulation and double bubble insulation reflective roll insulation.

8. The mobile hybrid shellfish cooling system of claim 7, wherein said exterior walls are configured to have an R-value of at least 16.

9. The mobile hybrid shellfish cooling system of claim 1, wherein said centrally positioned divider wall has multiple horizontal rows of openings defined therein and extending therethrough.

10. The mobile hybrid shellfish cooling system of claim 9, said centrally positioned divider wall further having a first vent extending through the divider wall above the horizontal rows of openings and a second vent extending through the divider wall below the horizontal rows of openings.

11. The mobile hybrid shellfish cooling system of claim 9, wherein one or more top horizontal rows of openings are aligned with a compartment defined above a top one of the horizontal shelves, wherein each opening of said one or more top horizontal rows of openings has a first diameter.

12. The mobile hybrid shellfish cooling system of claim 11, wherein one or more middle horizontal rows of openings are aligned with a compartment defined above a middle one of the horizontal shelves, wherein each opening of said one or more middle horizontal rows of openings has a second diameter that is larger than said first diameter.

13. The mobile hybrid shellfish cooling system of claim 12, wherein one or more bottom horizontal rows of openings are aligned with a compartment defined above a bottom one of the horizontal shelves, wherein each opening of said one or more bottom horizontal rows of openings has a third diameter that is larger than said second diameter.

14. The mobile hybrid shellfish cooling system of claim 1, further comprising an overhead awning extending over said frame and said cooling chamber and a solar panel integrated in said overhead awning.

15. The mobile hybrid shellfish cooling system of claim 14, wherein said overhead awning is retractable.

* * * * *